(12) United States Patent
Cosatto et al.

(10) Patent No.: US 7,627,478 B2
(45) Date of Patent: Dec. 1, 2009

(54) SYSTEM FOR LOW-LATENCY ANIMATION OF TALKING HEADS

(75) Inventors: Eric Cosatto, Highlands, NJ (US); Hans Peter Graf, Lincroft, NJ (US); Joern Ostermann, Morganville, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 364 days.

(21) Appl. No.: 11/778,228

(22) Filed: Jul. 16, 2007

(65) Prior Publication Data
US 2008/0015861 A1 Jan. 17, 2008

Related U.S. Application Data

(63) Continuation of application No. 10/423,789, filed on Apr. 25, 2003, now Pat. No. 7,260,539.

(51) Int. Cl.
G10L 21/00 (2006.01)
(52) U.S. Cl. ........................... 704/275; 345/473
(58) Field of Classification Search ................ 704/270, 704/275; 345/473–475
See application file for complete search history.

(56) References Cited
U.S. PATENT DOCUMENTS

| | | |
|---|---|---|
| 5,586,264 A | 12/1996 | Belknap et al. |
| 5,898,883 A | 4/1999 | Fujii et al. |
| 5,943,648 A | 8/1999 | Tel |
| 6,163,779 A | 12/2000 | Mantha et al. |
| 6,181,351 B1 | 1/2001 | Merrill et al. |

(Continued)

FOREIGN PATENT DOCUMENTS
GB 2334648 8/1999

(Continued)

OTHER PUBLICATIONS
Ball, T. et al., "Speech-Enabled Services Using Teleportal Software and Vocie XML", Bell Labs Technology, Bell Laboratoires, Murrey Hill, New Jersey, US Jul. 3, 2000, pp. 98-111.

(Continued)

Primary Examiner—Michael N Opsasnick

(57) ABSTRACT

Methods and apparatus for rendering a talking head on a client device are disclosed. The client device has a client cache capable of storing audio/visual data associated with rendering the talking head. The method comprises storing sentences in a client cache of a client device that relate to bridging delays in a dialog, storing sentence templates to be used in dialogs, generating a talking head response to a user inquiry from the client device, and determining whether sentences or stored templates stored in the client cache relate to the talking head response. If the stored sentences or stored templates relate to the talking head response, the method comprises instructing the client device to use the appropriate stored sentence or template from the client cache to render at least a part of the talking head response and transmitting a portion of the talking head response not stored in the client cache, if any, to the client device to render a complete talking head response. If the client cache has no stored data associated with the talking head response, the method comprises transmitting the talking head response to be rendered on the client device.

20 Claims, 2 Drawing Sheets

U.S. PATENT DOCUMENTS

| | | |
|---|---|---|
| 6,253,282 B1 | 6/2001 | Gish |
| 6,295,068 B1 | 9/2001 | Peddada et al. |
| 6,363,413 B2 | 3/2002 | Kidder |
| 6,392,652 B1 | 5/2002 | Cronin et al. |
| 6,393,526 B1 | 5/2002 | Crow et al. |
| 6,426,753 B1 | 7/2002 | Migdal |
| 6,433,784 B1 | 8/2002 | Merrick et al. |
| 6,442,651 B2 | 8/2002 | Crow et al. |
| 6,463,467 B1 | 10/2002 | Mages et al. |
| 6,477,537 B2 | 11/2002 | Gustman |
| 6,539,354 B1 | 3/2003 | Sutton et al. |
| 6,593,936 B1 | 7/2003 | Huang et al. |
| 6,604,077 B2 | 8/2003 | Dragosh et al. |
| 6,625,576 B2 | 9/2003 | Kochanski et al. |
| 6,636,219 B2 | 10/2003 | Merrick et al. |
| 6,650,889 B1 | 11/2003 | Evans et al. |
| 6,661,418 B1 | 12/2003 | McMillan et al. |
| 6,976,082 B1 | 12/2005 | Ostermann et al. |
| 7,006,098 B2 | 2/2006 | Bickmore et al. |
| 7,019,749 B2 | 3/2006 | Guo et al. |
| 7,027,054 B1 | 4/2006 | Cheiky et al. |
| 7,046,728 B1 | 5/2006 | Acharya et al. |
| 7,054,949 B2 | 5/2006 | Jennings |
| 2002/0124100 A1 | 9/2002 | Adams |
| 2003/0137515 A1 | 7/2003 | Cederwall et al. |

FOREIGN PATENT DOCUMENTS

| | | |
|---|---|---|
| WO | WO 2001/091868 | 12/2001 |
| WO | WO 2004/097684 | 11/2004 |

OTHER PUBLICATIONS

Kshirsagar, S. et al., "Personalized Face and Speech Communication Over the Internet", Procedings IEEE 2001 Virtual Reality, Yokohama, Japan, Mar. 13, 2001, pp. 37-44.

Muller, W. et al., "Face to Fact with Your Assistant. Realization Issues of Animated User Interface Agents for Home Appliances", Computers and Graphics, Pergamon Press, LTD., Oxford, Great Britain, Aug. 4, 2001, pp. 593-600.

Uz et al., "Realistic Speech Animation of Synthetic Faces," Computer Animation 1998, pp. 111-118.

Goto et al., "Automatic Face Cloning and Animation", IEEE Signal Processing Magazine, pp. 17-25.

Ostermann et al., "Real-time streaming for the animation of talking faces in multiuser environments", ATT Labs Research, pp. 437-440.

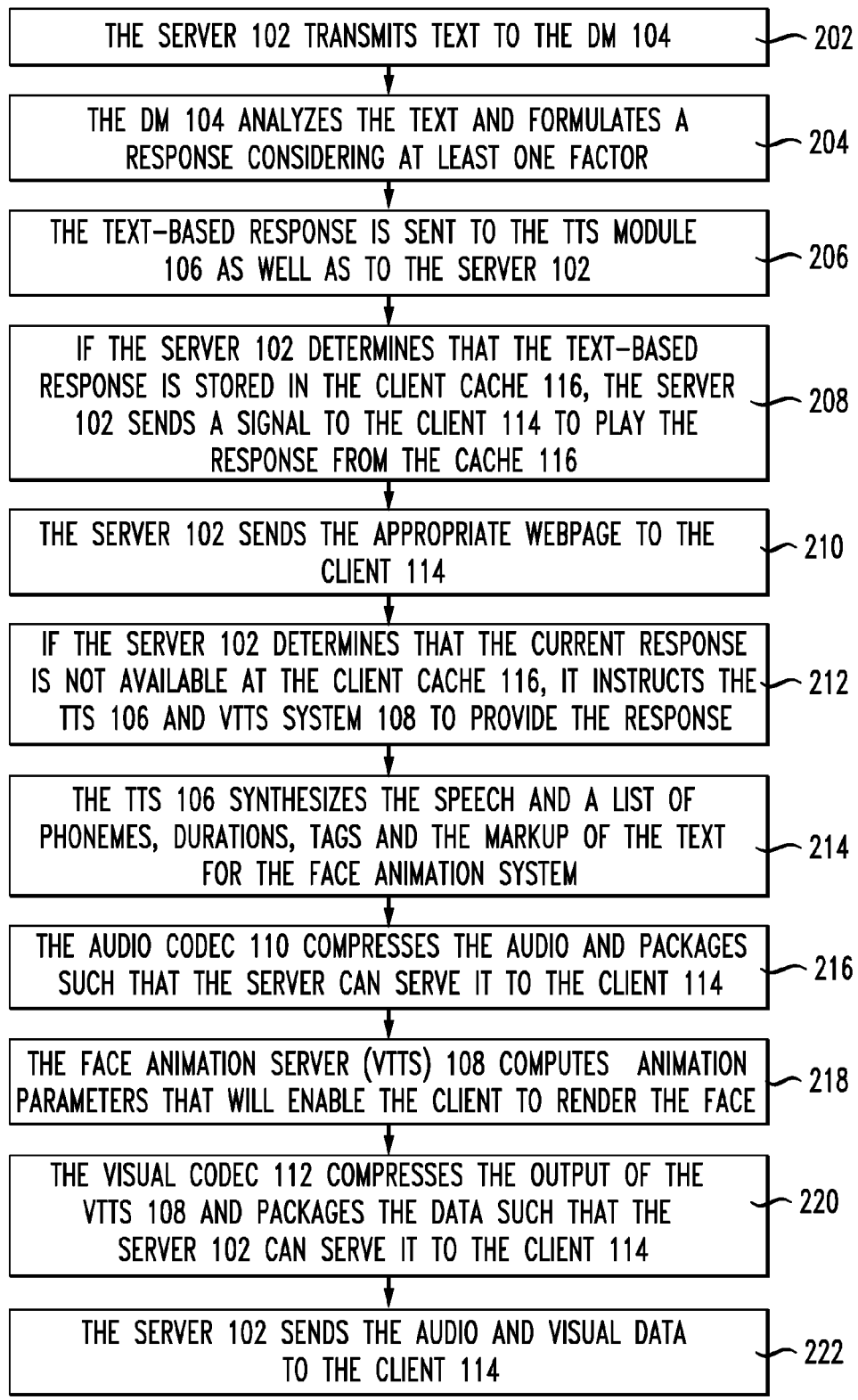

SYSTEM FOR LOW-LATENCY ANIMATION OF TALKING HEADS

PRIORITY INFORMATION

The present application is a continuation of U.S. patent application Ser. No. 10/423,789, filed Apr. 25, 2003, now U.S. Pat. No. 7,260,539, the contents of which is incorporated herein by reference in its entirety. The present application is also related to International Application No. PCT/US2004/012402, filed Apr. 22, 2004, the contents of which is incorporated herein by reference in its entirety.

BACKGROUND OF THE INVENTION

1. Field of the Invention

The present invention relates to network-based talking heads and more specifically relates to an architecture to reduce the latency of talking head animation in a network environment.

2. Introduction

A growing number of websites use natural language interfaces to communicate with their customers, to guide customers for more successful self-service and to enhance the user experience. In some cases, some sites provide varying images of talking heads to express moods (happy, offended, sad) in addition to the text displayed in the browser window. In the progression of this technology, animated talking faces for customer service and sales applications on the Internet further enhance the communication between an organization and its customers.

The use of natural language interfaces in web-based interactions typically consists of several major components and steps: (1) the client uses a regular web browser such as Internet Explorer or Netscape; (2) the user types text into a text box on a web page; (3) this text is sent to the server; (4) the server transmits the text to a dialog manager which consists of several modules including natural language understanding, dialog control and natural language generation; and (5) the dialog manager transmits responsive text to the server which forwards the text with the appropriate web page(s) to the client. Compared to simple websites that serve up web pages without further processing at the server, the latency of the server response as perceived by the client is increased by the response time of the dialog manager.

In cases where the user interaction with the website further includes a talking face, two additional steps must occur: (1) speech needs to be synthesized using a speech synthesizer (TTS); and (2) based on the phonemes created by the TTS, a renderer animates the face. While speech synthesis can be done faster than realtime, the latency of a TTS system (Time to first audio) usually exceeds 0.3 seconds. In web interactions, people are often exposed to considerable latencies due to slow download speeds; but as web interactions become more like face-to-face conversations, low latencies are essential. Delays above 0.3 seconds in response are noticeable and irritate the user.

Based on the phoneme and related information from the TTS, the talking head is animated. While face animation can be done in real time, the face renderer also adds latency to the system. Depending on the face model, time to first video can exceed 0.5 seconds. High quality face animation systems use coarticulation models to compute the mouth shapes. The current mouth shape depends on previous sounds. Furthermore, the mouth moves in anticipation of sounds adding further to the latency of the face animation. The current invention solves these problems by introducing caches at the client and server side that can present talking head animations with a low latency while the server is generating new parts of the animation.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a method according to another embodiment of the invention.

DETAILED DESCRIPTION OF THE INVENTION

Figure 1:
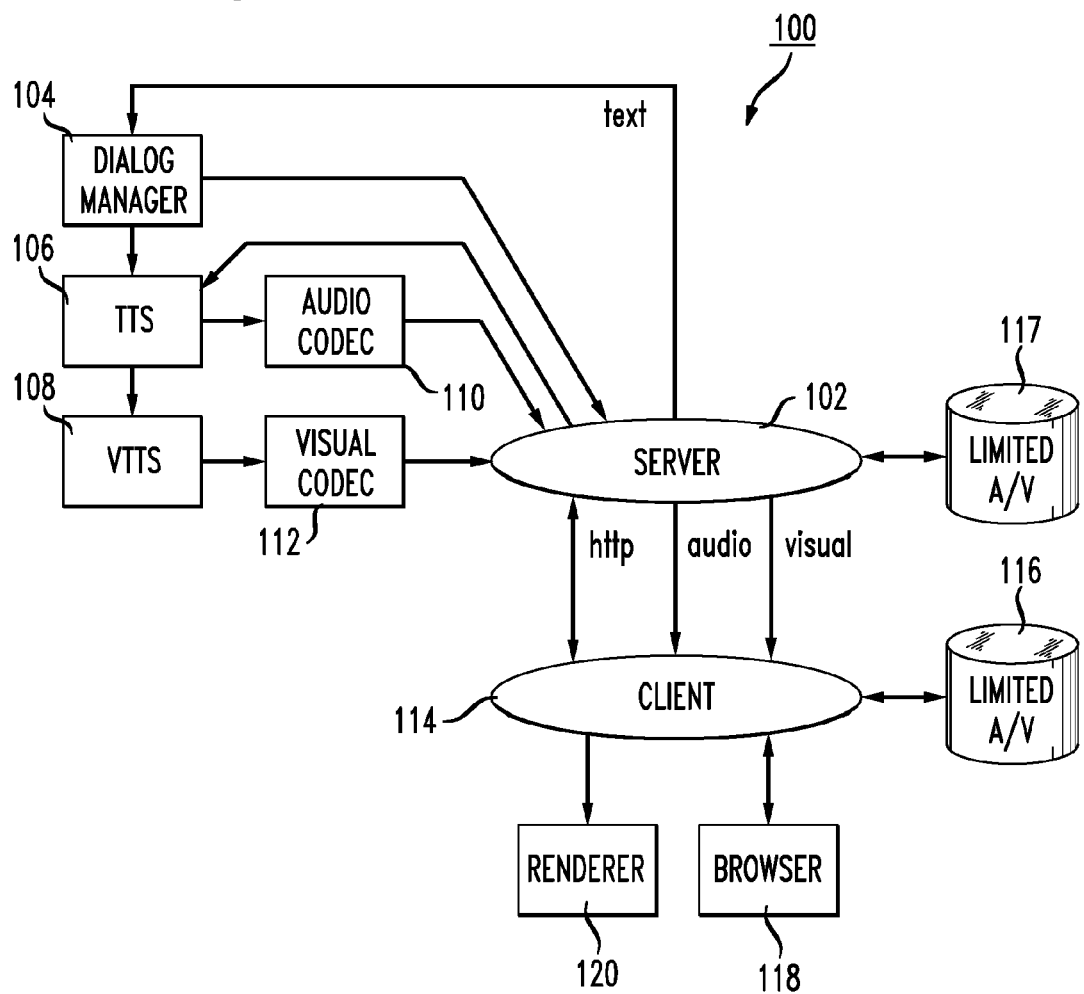
FIG. 1 illustrates an example architecture according to an embodiment of the invention.

Latency of face animation impedes communications between a web server and a user, thus making the user experience unnatural. Disclosed herein is an architecture that reduces the latency of the face animation system using a cache on the client and/or a cache on the server. The server keeps track of the information in the client cache. Furthermore, the server-based TTS and visual TTS (VTTS) systems may use a cache in order to avoid computing identical animations for multiple users. The architecture is suitable to support servers that use a dialog manager to create dynamic contents as well as servers that send static content to the client.

Caching on the Internet follows to a large extent the same principles as caching in computers. The web pages that have been downloaded previously are stored in a local cache. If this page is accessed within a limited period of time, the cached page is shown instead of downloading a new page from the server. Extensions of this principle are proxy caches, where the most popular pages are cached on multiple servers, so that pages can be retrieved from a server that is 'closer' to the user than the original server.

The present invention relates to a caching system and method that reduces the latency in network-based dialogs between a user and a talking head. Dialogs are particularly demanding with respect to latency since users expect a swift reaction to their input. Caching can reduce latency and required bandwidth any time there is a repetition in the data/animations presented to the viewer or when there is a predictable reaction. Fortunately, in dialogs repetitions and predictable reactions are very common, making caching mechanisms particularly effective.

Caching can reduce latency and required bandwidth by storing animations, graphics and data at the client in multiple ways. In contrast to conventional caching on the Internet, dialog-caching requires storing part of the computer responses on the client prior to their playout time. Actual computer responses consist then of a mixture of information preemptively cached on the client and new information sent from the server. This information needs to be presented without the user noticing from which source it comes. This preemptive caching can be static in the sense that it is the same or dynamic where the dialog manager controls the caching based on dialog probabilities. Examples of a static caching include phrases such as "Good morning," and "Glad to have you back." Dynamic caching relate to information that changes such as a checking account amount or the day or time. Phrases like "Hello, your account balance is $130.23" will have a static portion (the words in the sentence) and a dynamic portion (the account amount).

The data stored in either a client cache and/or a server cache may be parameters related to audio information, text information, or visual information. The information may be audio or visual parameters or actual audio signals or video images. The Audio information may refer to speech, text, or mark-up information that accompanies text used for speech.

FIG. 1 shows an exemplary architecture 100 that comprises components such as a server 102 communicating with a dialog manager (DM 104. The DM 104 communicates with a text-to-speech (TTS) module 106 and a visual TTS (VTTS) module 108. The TTS module 106 communicates with an audio codec 110 and VTTS 108 communicates with a visual codec 112. The DM 104, audio codec 110 and visual codec 112 communicate with the server 102.

The server 102 communicates with a client 114 by receiving HTTP requests and transmitting audio and visual information to the client 114 to generate a talking head and web pages to carry on a dialog with a user. An audio/visual cache 116 communicates with the client 114. A renderer 120 and a web browser 118 communicate with the client 114. The server may also have a database or server cache 117 that stores information related to the client cache 117. The information may be a copy of the client cache 116 or parameters identifying what information is stored in the client cache 116. For example, the server may store information such as sentences 1-12 and 25-45 are stored in the client cache 116. The server cache 117 may also store dynamic information that will be inserted into numerous static/dynamic phrases to be spoken by the talking head. For example, the server could calculate that today is Feb. 12, 2003, and will only need to do this once for all the conversations occurring that require this dynamic information. In this regard, you can store audio and visual information on the server cache 117 and draw upon this information in at least one dialog or multiple dialogs where the audio and visual data is required.

The server 102 and client 114 communicate over the Internet using the appropriate and known protocols. To begin a description of an embodiment of the invention, assume the server 102 receives an HTTP request from the client 114. In the following example steps, illustrated in FIG. 2, it is assumed that the server 102 needs to use the DM 104 in order to serve the request from the client 114.

The server 102 transmits text to the DM 104 (202). This text may be the input from the client 114 extracted from the HTTP request or some text derived from the web page associated with the requested URL. The DM 104 analyzes the text and formulates a response considering the state of the dialog, the click trail of the user and other items. (204). The text-based response may contain markup that indicates emotional states like happiness, disgust, anticipation, etc. The text-based response is sent to the TTS module 106 as well as to the server 102 (206). If the server 102 determines that the text-based response is stored in the client cache 116, the server 102 sends a signal to the client 114 to play the response from the cache 116 (208). Furthermore, the server 102 sends the appropriate web page to the client 114 (210). If the server 102 determines that the current response is not available at the client cache 116, it instructs the TTS 106 and VTTS system 108 to provide the response (212). The TTS 106 synthesizes the speech and a list of phonemes, durations, tags and the markup of the text for the face animation system and transmits the speech and other data, if any, to the audio codec 110 (214). The audio codec 110 compresses the audio and packages the data such that the server can serve it to the client (216). The face animation server (VTTS) 108 computes animation parameters that will enable the client to render the face (218). Animation parameters may include head and eye motion, facial expressions, videos of the mouth and/or eye area of the face model and videos of the entire head.

The visual codec 112 compresses the output of the VTTS 108 and packages the data such that the server 102 can serve it to the client 114 (220). The server 102 sends the audio and visual data to the client 114 (222). The data includes timestamps that enable the decoder to synchronously present the rendered face model and the associated audio. The server 102 may send a flag to the client 114 instructing the client to store this information in its cache 116. The server 102 keeps track of the client cache 116 either by keeping a copy of the client cache 116 or by keeping only the response of the dialog manager 104 in the server cache (not shown) as an indication of contents in the client cache 116. Furthermore, the server 102 may choose to send a web page that provides new or updated information to the user. The web page may be sent prior to the transmission of the audio/visual data.

The terminal device of the user (not shown) includes the client 114 that interprets the received data. The HTTP data is sent to the browser 118. If the server 102 sends a flag, audio/visual data is sent to the renderer 120. Using another flag, the server 102 may indicate that this audio/visual data is to be stored in the database on the client 114. Alternatively, a flag can indicate that the audio/visual data is to be sent to both the renderer 120 as well as the database 116. As used herein, the terms database and cache typically have a similar meaning. Alternatively, the server might request that data from the client_cache 116 is sent to the renderer 120.

Upon receipt of the data from the server 102, the client 114 decodes the audio/visual data, renders the face model based on the visual data and presents it synchronized with the audio. Furthermore, the web page received from the server 102 is rendered on the browser 118 of the terminal.

Compared to an architecture without a cache on a client, the latency of the system is only reduced if the audio visual data is available in the local cache. Therefore, the server 102 according to an aspect of the invention begins storing sentences for bridging delays in the cache 116 of the client as soon as the client 114 connects to the server 102 and while waiting for input from the client 114. Typical sentences to be stored are greetings ("Hello", "Good-bye") and sentences for masking delays ("Please wait a second", "just a moment please", "Let me check our database"). The server 102 may also store templates for sentences like "The time is now..." In this example, the server 102 would only have to send the variable part of the template—the actual time like "5 pm" to the client 114. While the template is played, the variable part is received from the server 102, resulting in a very low latency response to the user.

Other information to be stored in the client cache 116 is idle behavior of the face model. This information may be termed "behavioral templates". Such templates may provide talking head visual information such as listening behavior and waiting behavior. Such behavior templates provide a variety of visual prosody patterns that make the interaction with the user more natural given the context. The behavioral templates can cover visual prosody for any component of a conversation. In addition to the listening behavior discussed above, the talking behavior can also be included. For example, if the talking head needs to ask a question twice, the visual prosody may change to be more serious and intense. The visual prosody may be different for greeting a user with "Good morning!" than informing the user that "you owe $55 in late fees." Further, there may be transition visual prosody that enables the talking head to move appropriately if the system determines that the user is about to finish a phrase and it is the turn of the talking head to speak. A behavioral template to simulate a normal conversation can cover any visual queue or motion of the talking head.

The client cache 116 size might be limited and therefore the client 114 in one aspect of the invention informs the server 102 when it removes information from the cache 116. Alternatively, the server 102 informs the client 116 which parts are not needed anymore.

Many parts of a dialog are predetermined. An indication of this is that a dialog system like AT&T's "How May I Help You?" uses only recorded prompts to interact with its users. Therefore, the server 102 can pre-compute many sentences of a dialog. In one aspect of the invention, the system stores these pre-computed sentences in a server cache (not shown). Every time the dialog manager 104 sends a response with a synthesis request to TTS 106 and VTTS 108, the server cache is checked. If response is in the cache, it is forwarded immediately to the server 102, thus not increasing latency compared to a text-only web-based dialog system. Requests that need to be synthesized are stored in the server cache for potential future use.

In order to leverage the multitude of dialogs that happen between a server 102 and its many clients 114, the server cache of audio/visual data may be common to all dialogs. In this case, the server 102 will only have to synthesize responses containing dynamic information (personal data like phone numbers, volatile information like time). Computation time may be further reduced by pre-computing sentences using templates. Templates are commonly used in dialog systems. For example, in a shopping environment, users might want to know the value of the items in their shopping cart. The dialog manager 104 might be able to convey the total price using sentences like "Your total is $X," or "Today, you ordered for $X." The audio and visual part of the fixed part of the template may be pre-computed. Together with the pre-computed audio/visual data, the TTS 106 and VTTS 108 will save the state of their algorithms such that they can continue processing a response as soon as the dynamic part is known.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communication connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communication network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, a client device could receive via a downloading process a dialog manager as well as a TTS module. In this regard, although above the preferred embodiment shows a dialog manager and TTS module (and other modules) remote from the client device 114, it is contemplated that the location on the network of the TTS module and dialog manager are irrelevant to the present invention. Accordingly, these various modules may exist on any node of any network and the particular claims are not limited to any architecture in this regard. The appended claims and their legal equivalents should only define the invention, rather than any specific examples given.

We claim:

1. A computer-readable medium storing instructions for controlling a computing device to render a talking entity, the computing device having a cache capable of storing data associated with rendering the talking entity, the instructions comprising:
   A. establishing a network connection between the computing device and a server, and soon thereafter storing sentences from the server in a client cache of the computing device that relate to bridging delays in a dialog;
   B. storing templates to be used in dialogs;
   C. generating a talking entity response to a user inquiry;
   D. determining whether sentences or stored templates in the cache relate to the talking entity response;

E. if stored sentences or stored templates relate to the talking entity response:
 1. using the appropriate sentence or stored template from the cache to render at least a part of the talking entity response; and
 2. receiving portion of the response not stored in the cache, if any, at the computing device to render a complete talking entity response;
F. if the client cache has no stored data associated with the talking head response:
 1. receiving the talking entity response to be rendered on the computing device; and
G. rendering the talking head response on the computing device.

2. The computer-readable medium of claim 1, wherein the instructions further comprise storing idle behavior associated with the talking entity in the cache.

3. The computer-readable medium of claim 2, wherein the idle behavior relates to listening behavior and waiting behavior of the talking entity.

4. The computer-readable medium of claim 1, wherein the computing device comprises two or more devices.

5. The computer-readable medium of claim 4, wherein the two or more devices comprises a server device and a client device.

6. The computer-readable medium of claim 1, wherein the talking entity is a talking head.

7. The computer-readable medium of claim 1, wherein the stored template is associated with a behavior template for the talking entity when the talking entity is asking a question for the second time.

8. The computer-readable medium of claim 1, wherein the stored template is associated with listening behavior.

9. The computer-readable medium of claim 1, wherein the stored template is associated with behavior when waiting for an answer to a question.

10. A computer-implemented method of rendering a talking head on a computing device having a client cache capable of storing audio/visual data associated with rendering the talking head, the method comprising:
 A. establishing a network connection between the computing device and a server, and soon thereafter storing sentences from the server in a client cache of the computing device that relate to bridging delays in a dialog;
 B. storing templates to be used in dialogs;
 C. generating a talking entity response to a user inquiry;
 D. determining whether sentences or stored templates in the cache relate to the talking entity response;
 E. if stored sentences or stored templates relate to the talking entity response:
  1. using the appropriate sentence or stored template from the cache to render at least a part of the talking entity response; and
  2. receiving portion of the response not stored in the cache, if any, at the computing device to render a complete talking entity response;
 F. if the client cache has no stored data associated with the talking head response:
  1. receiving the talking entity response to be rendered on the computing device; and
 G. rendering the talking head response on the computing device.

11. The computer-implemented method of claim 10, further comprise storing idle behavior associated with the talking entity in the cache.

12. The computer-implemented method of claim 11, wherein the idle behavior relates to listening behavior and waiting behavior of the talking entity.

13. The computer-implemented method of claim 10, wherein the computing device comprises two or more devices.

14. The computer-implemented method of claim 13, wherein the two or more devices comprise a server device and a client device.

15. The computer-implemented method of claim 10, wherein the talking entity is a talking head.

16. The computer-implemented method of claim 10, wherein the stored template is associated with a behavior template for the talking entity when the talking entity is asking a question for the second time.

17. The computer-implemented method of claim 10, wherein the stored template is associated with listening behavior.

18. A computing device for rendering a talking entity, the computing device having a computer-readable medium tangibly storing functional modules and a cache capable of storing data associated with rendering the talking entity, the computing device comprising:
 A. a module configured to establish a network connection between the computing device and a server, and soon thereafter store sentences from the server a client cache of the computing device that relate to bridging delays in a dialog;
 B. a module configured to store templates to be used in dialogs;
 C. a module configured to generate a talking entity response to a user inquiry;
 D. a module configured to determine whether sentences or stored templates in the cache relate to the talking entity response;
 E. a module configured, if stored sentences or stored templates relate to the talking entity response to:
  1. use the appropriate sentence or stored template from the cache to render at least a part of the talking entity response; and
  2. receive a portion of the response not stored in the cache, if any, to the computing device to render a complete talking entity response;
 F. a module configured, if the client cache has no stored data associated with the talking head response to:
  1. receive the talking entity response to be rendered on the computing device; and
 G. a module configured to render the talking head response on the computing device.

19. The computing device of claim 18, further comprising a module configured to store idle behavior associated with the talking entity in the cache.

20. The computing device of claim 19, wherein the idle behavior relates to listening behavior and waiting behavior of the talking entity.

* * * * *